United States Patent [19]
Noji et al.

[11] Patent Number: 5,971,711
[45] Date of Patent: Oct. 26, 1999

[54] VACUUM PUMP CONTROL SYSTEM

[75] Inventors: Nobuharu Noji, Fujisawa; Koichi Kido, Yokohama, both of Japan

[73] Assignee: Ebara Corporation, Tokyo, Japan

[21] Appl. No.: 08/858,622

[22] Filed: May 19, 1997

[30] Foreign Application Priority Data

May 21, 1996 [JP] Japan .................................. 8-149931

[51] Int. Cl.⁶ .................................................. F04B 41/06
[52] U.S. Cl. ........................................................... 417/2
[58] Field of Search ................... 417/901, 2, 3, 417/5, 7, 8

[56] References Cited

U.S. PATENT DOCUMENTS

| | | | |
|---|---|---|---|
| 4,319,338 | 3/1982 | Grudowski et al. | 364/900 |
| 4,918,930 | 4/1990 | Gaudet et al. | 62/55.5 |
| 5,050,397 | 9/1991 | Sugiyama et al. | 62/175 |
| 5,157,928 | 10/1992 | Gaudet et al. | 62/55.5 |
| 5,305,467 | 4/1994 | Herndon et al. | 455/56.1 |
| 5,345,787 | 9/1994 | Piltingsrud | 62/55.5 |
| 5,375,424 | 12/1994 | Bartlett et al. | 62/55.5 |
| 5,586,050 | 12/1996 | Makel et al. | 364/509 |
| 5,746,581 | 5/1998 | Okumura et al. | 417/2 |

FOREIGN PATENT DOCUMENTS

WO 93/05859  4/1993  WIPO .

*Primary Examiner*—Charles G. Freay
*Assistant Examiner*—Robert Z. Evora
*Attorney, Agent, or Firm*—Armstrong, Westerman, Hattori, McLeland & Naughton

[57] ABSTRACT

A vacuum pump control system is used for controlling a plurality of vacuum pumps comprising at least one type of cryopump, turbomolecular pump, cryoturbo pump, and dry pump such as a Roots type vacuum pump. The vacuum pump control system for controlling a plurality of vacuum pumps, comprises a host computer; a plurality of vacuum pump controllers connected respectively to said vacuum pumps; and a network control unit for transmitting information between the host computer and the vacuum pump controllers. The vacuum pump controllers are connected in parallel to the network control unit by respective communication lines.

11 Claims, 14 Drawing Sheets

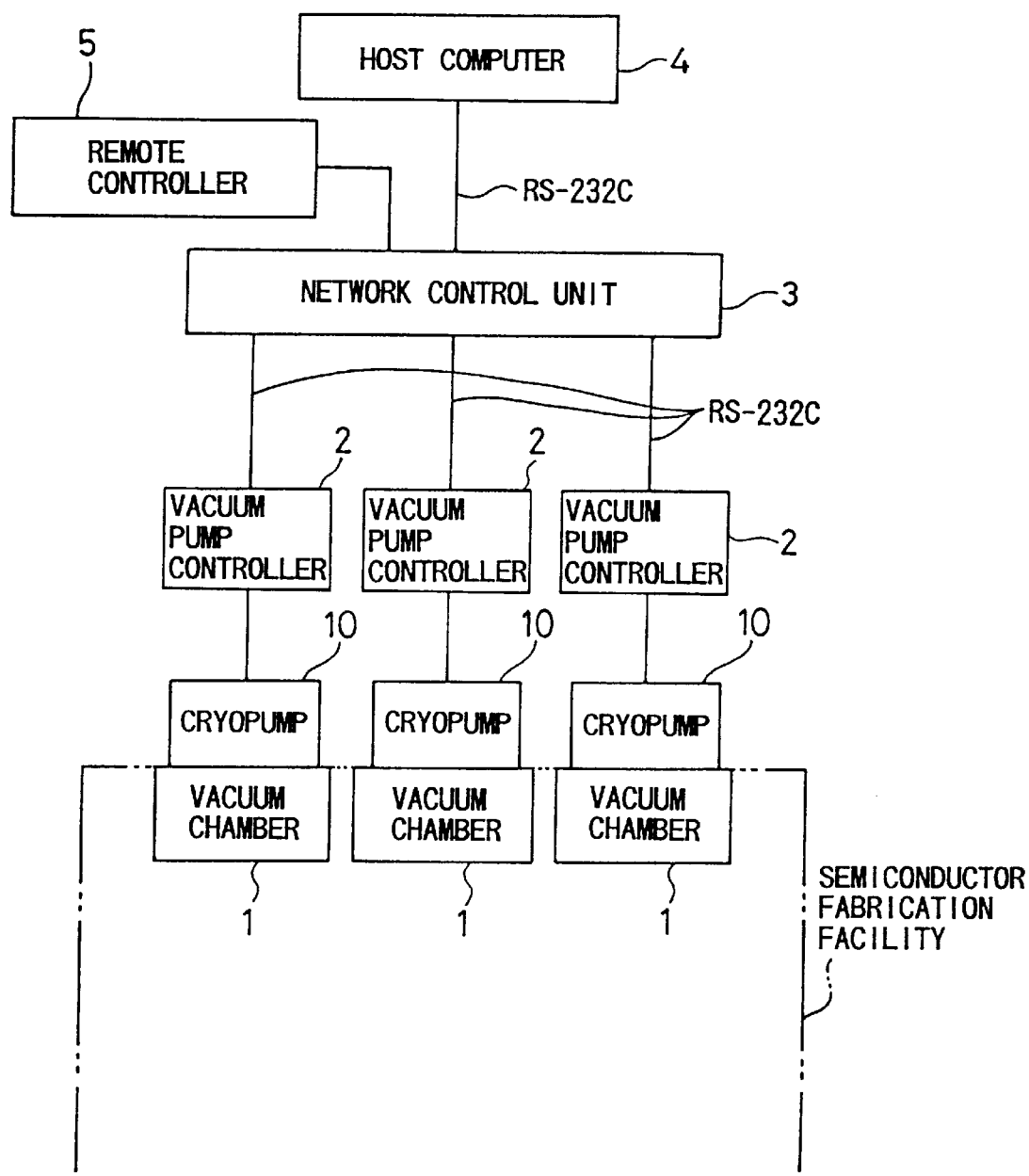
F I G. 1

VACUUM PUMP CONTROL SYSTEM

BACKGROUND OF THE INVENTION

1. Field of the Invention

The present invention relates to a vacuum pump control system, and more particularly to a vacuum pump control system which can control a plurality of vacuum pumps comprising at least one type of cryopump, turbomolecular pump, cryoturbo pump, and dry pump such as a Roots type vacuum pump.

2. Description of the Prior Art

Cryopumps have a first-stage cryopanel cooled to a temperature of 60 K–80 K for condensing water or the like, a second-stage cryopanel cooled to a temperature of 10 K–20 K for condensing a nitrogen gas ($N_2$), an argon gas (Ar) or the like, and an activated charcoal layer mounted on the second-stage cryopanel for adsorbing at a low temperature a hydrogen gas ($H_2$) or the like that is not condensed at a temperature of 10 K–20 K. The cryopump is generally used to develop a high vacuum in a vacuum chamber of a semiconductor fabrication facility such as a sputtering apparatus or an ion implantation apparatus.

Semiconductor fabrication facilities usually employ a plurality of cryopumps which are required to be controlled at the same time. A cryopump is a storage type vacuum pump, and hence need to be regenerated, i.e., to release the condensed or adsorbed gases from a cryopanel at periodic intervals. It is therefore necessary to control the cryopumps for regeneration.

Turbomolecular pumps, dry pumps comprising a Roots type vacuum pump, cryoturbo pumps, etc. are also used to develop a high vacuum in a vacuum chamber although they operate by different principles.

Recent semiconductor fabrication facilities have a plurality of vacuum chambers which are associated with respective vacuum pumps that may be of different types depending on processing conditions in the vacuum chambers. It is therefore necessary for the control system of the semiconductor fabrication facility to monitor and control the vacuum pumps of different kinds. The vacuum pumps are controlled by respective controllers which are connected to the control system of the semiconductor fabrication facility.

One system for controlling a plurality of vacuum pumps employs a daisy chain communications network which is a type of computer network. In the daisy chain communications network, a network control unit connected to a host computer is connected to a series-connected array of vacuum pump controllers which control respective vacuum pumps. This system is advantageous in that when the network control unit is apart from the vacuum pump controllers, or the vacuum pump controllers are apart from one another, the number of long cables can be reduced to a minimum.

The daisy chain communications network, however, suffers a problem in that since command signals from the host computer and/or the network control unit cannot be delivered simultaneously to all the vacuum pump controllers, a considerable time is required for, communication between the controllers and control of all the vacuum pumps.

In the event that a communication line is disconnected somewhere between the network control unit and the final vacuum pump controller on the daisy chain or a vacuum pump controller fails or troubles, those vacuum pump controllers which are located downstream of the communication line disconnection or downstream of the failing or broken controller cannot be controlled through the daisy chain communications network. When noise is introduced into the daisy chain communications network at a certain location on the communication line, those vacuum pump controllers which are located downstream of such a location cannot be normally worked.

SUMMARY OF THE INVENTION

It is therefore an object of the present invention to provide a vacuum pump control system which is capable of controlling a plurality of vacuum pumps quickly, and controlling other vacuum pumps normally even in the event of a line disconnection between a network control unit and a certain vacuum pump controller or a controller failure or the introduction of noise at a certain location.

Another object of the present invention is to provide a vacuum pump control system which has a multi-controller capable of controlling a plurality of vacuum pumps, and controlling a plurality of types of vacuum pumps.

To achieve the above objects, according to a first aspect of the present invention there is provided a vacuum pump control system for controlling a plurality of vacuum pumps, comprising: a host computer; a plurality of vacuum pump controllers connected respectively to the vacuum pumps; and a network control unit for transmitting information between the host computer and the vacuum pump controllers, the vacuum pump controllers being connected in parallel to the network control unit by respective communication lines.

Since the vacuum pump controllers are connected in parallel to the network control unit by respective communication lines, the network control unit can simultaneously control the vacuum pump controllers. Therefore, command signals from the network control unit can immediately reach the vacuum pump controllers at the same time for quickly controlling the vacuum pumps.

Even if a line disconnection occurs or noise is introduced between the network control unit and one of the vacuum pump controllers, or one of the vacuum pump controllers fails or malfunctions, the other vacuum pump controllers are not adversely affected by the line disconnection, the noise, or the vacuum pump controller failure or malfunction, and can properly monitor and control the corresponding vacuum pumps.

According to a second aspect of the present invention, there is also provided a vacuum pump control system for controlling a plurality of vacuum pumps, comprising: a host computer; and a multi-controller connected between the host computer and the vacuum pumps for controlling the vacuum pumps.

A plurality of vacuum pumps can be monitored and controlled by the single multi-controller. Control modules are detachably inserted in the multi-controller for controlling the vacuum pumps. The vacuum pumps which need to be monitored and controlled can thus be handled by a minimum amount of hardware provided by the control modules.

Different types of vacuum pumps and a plurality of vacuum pumps can be monitored and controlled by installing control modules corresponding to types of vacuum pumps in the multi-controller.

The host computer, which may serve as a controller of a semiconductor fabrication facility using the vacuum pumps, can therefore monitor and control different types of vacuum pumps and a plurality of vacuum pumps by exchanging information with the multi-controller.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 1 is a block diagram showing a vacuum pump control system according to a first embodiment of a first aspect of the present invention;

DETAILED DESCRIPTION OF THE PREFERRED EMBODIMENTS

Figure 2:
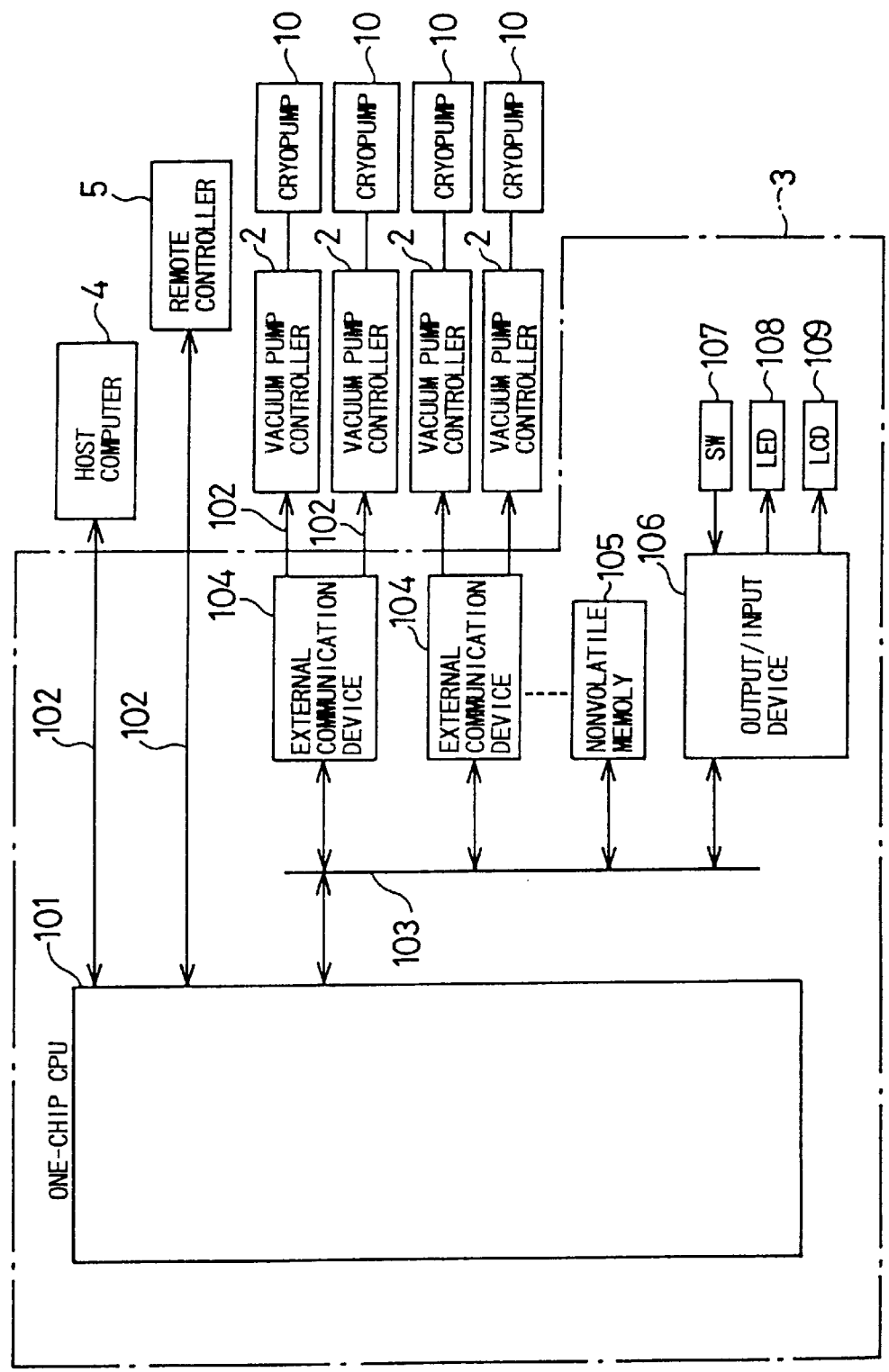
FIG. 2 is a detailed block diagram of a network control unit of the vacuum pump control system shown in FIG. 1.

A vacuum pump control system according to a first embodiment of a first aspect of the present invention will be described below with reference to FIGS. 1 through 4.

As shown in FIG. 1, a plurality of cryopumps 10 are connected respectively to vacuum chambers 1 of a semiconductor fabrication facility such as a sputtering apparatus or an etching apparatus. The cryopumps 10 are also connected to respective vacuum pump controllers 2 which control the corresponding cryopumps 10 to operate in various modes, e.g., start the cryopumps 10, stop the cryopumps 10, and start a regenerating process of the cryopumps 10. A dry pump comprising a Roots type vacuum pump (not shown) is provided at the downstream of the cryopump for assisting evacuation of the cryopump.

The vacuum pump controllers 2 are connected in parallel to a network control unit 3 by respective RS-232C cables, and the network control unit 3 is connected to a host computer 4 of the semiconductor fabrication facility by an RS-232C cable.

The network control unit 3 has a relay function to deliver command signals, e.g., command signals for starting the cryopumps 10, stopping the cryopumps 10, and starting the regenerating process from the host computer 4, to the vacuum pump controllers 2, and also to transmit signals from the vacuum pump controllers 2 to the host computer 4. The network control unit 3 also has a control function to set and modify control variables for the cryopumps 10, and a display function to display operation statuses of the cryopumps 10 and values of temperature, pressure, etc. in the cryopumps 10. The operation statuses include operating status, stopping status, regenerating status and the like. The network control unit 3 further has a maintenance function to integrate the operation times of the cryopumps 10 and determine the timing of regeneration of the cryopumps 10 and the timing of maintenance on the cryopumps 10, and a manual control function to allow the cryopumps 10 and valves and other devices thereof to be manually operated. A remote controller 5 for setting and modifying control variables for the cryopumps 10.

Details of the network control unit 3 will be described below with reference to FIG. 2.

FIG. 2 shows a one-board block scheme (enclosed by the dot-and-dash line) of the network control unit 3 and its relation to the other devices of the vacuum pump control system. As shown in FIG. 2, the network control unit 3 has various devices on one board for simultaneously controlling the vacuum pump controllers 2, and is connected to the host computer 4 and the remote controller 5 by communication lines 102.

The network control unit 3 has a one-chip CPU 101 connected by a bus 103 to a plurality of external communication devices 104, a nonvolatile memory 105, and an output/input device 106. Each of the external communication devices 104 has two communication lines 102 and can be connected to two vacuum pump controllers 2. Therefore, the number of external communication devices 104 in the network control unit 3 is determined depending on the number of cryopumps 10 to be controlled by the vacuum pump control system. Switches 107, light-emitting diodes 108, and liquid-crystal display units 109 are connected to the output/input device 106.

The network control unit 3 is supplied with electric power through a power supply cable (not shown). When a power switch of the switches 107 is turned on, the one-chip CPU 101 reads settings such as control variables from the nonvolatile memory 105 for performing the functions of the network control unit 3.

Command signals delivered from the host computer 4 or the remote controller 5 through the communication lines 102 are processed by the one-chip CPU 101, and transmitted through transmission paths including the bus 103, the external communication devices 104, and the communication lines 102 to the vacuum pump controllers 2. Even if a plurality of command signals are simultaneously supplied, they can be transmitted in parallel to the vacuum pump controllers 2 through the communication lines 102.

Signals from the vacuum pump controllers 2 are transmitted to the host computer 4 through transmission paths which are a reversal of the above transmission paths. To set and modify control variables for operating the cryopumps 10, signals are entered from the switches 107 serving as a keyboard and supplied through the output/input device 106 and the bus 103 to the one-chip CPU 101. The signals are then processed by the one-chip CPU 101, and delivered through the bus 103 and the external communication device 104 to the vacuum pump controllers 2.

An input for setting and modifying control variables may be made from the host computer 4 or the remote controller 5. Data indicative of operation statuses of the cryopumps 10 and values of temperature, pressure, etc. in the cryopumps 10 are supplied from the cryopumps 10 through the vacuum pump controllers 2, the communication lines 102, the external communication devices 104, the bus 103, the one-chip CPU 101, the bus 103, and the output/input device 106 to the liquid-crystal display unit 109 and the light-emitting diodes 108, and the liquid-crystal display unit 109 and the light-emitting diodes 108 display the operation statuses and the values. The operation statuses and the values can also be displayed on the remote controller 5.

The one-chip CPU 101 has a built-in timer for calculating or integrating the operation times of the cryopumps 10. According to the maintenance function, the one-chip CPU 101 determines the timing to regenerate the cryopumps 10 and the timing to perform maintenance on the cryopumps 10 based on the calculated operation times, and displays the determined timings on the liquid-crystal display unit 109 and the remote controller 5.

According to the manual control function, the network control unit 3 allows the cryopumps 10 and valves and other devices thereof to be manually operated, i.e., started, stopped, started for regeneration, and opened and closed, in response to signals entered through the switches 107. The remote controller 5 has all the functions which the network control unit 3 has, except for the relay function to deliver command signals from the host computer 4 to the vacuum pump controllers 2 and to transmit signals from the vacuum pump controllers 2 to the host computer 4. Therefore, the remote controller 5 may be located in any place where the operator is immediately accessible and can quickly manipulate the remote controller 5, for controlling the network control unit 3. With the remote controller 5, the operator finds it highly convenient to control the cryopumps 10.

Figure 3:
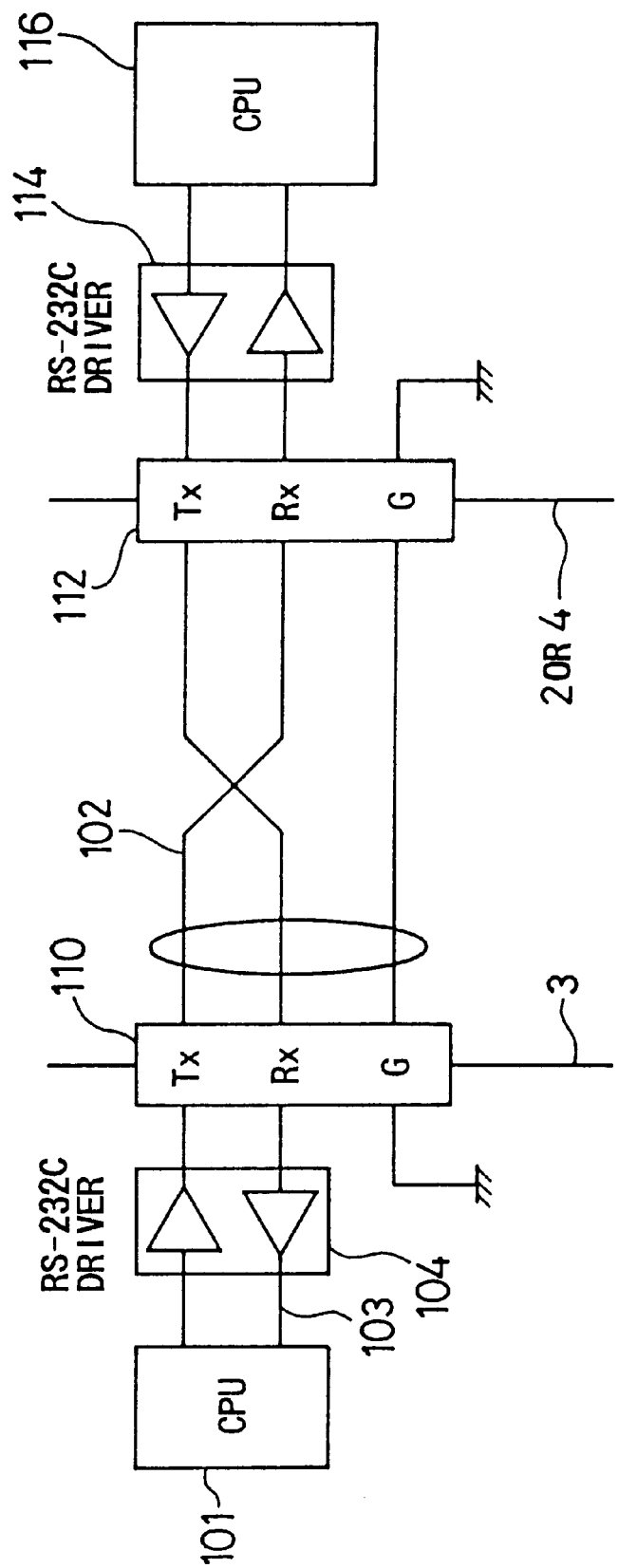
FIG. 3 is a block diagram showing communication lines and peripheral devices connected thereto in the vacuum pump control system shown in FIG. 1.

The communication lines 102 and peripheral devices connected thereto will be described below with reference to FIG. 3. As shown in FIG. 3, the network control unit 3 is shown on a left-hand side, and the host computer 4 or the vacuum pump controller 2 is shown on a right-hand side. The network control unit 3 has the one-chip CPU 101 therein which is connected to the external communication device 104 through the bus 103. The external communication device 104 comprising an RS-232C driver, communicates with the vacuum pump controller 2 or the host computer 4 through a connector 110 and the communication lines 102. The host computer 4 or the vacuum pump controller 2 also has a CPU 116, an external communication device 114 comprising an RS-232C driver, and a connector 112 which is connected to the communication lines 102, each comprising an RS-232C cable.

As shown in FIG. 3, since the transmission and reception cables as RS-232C cables are physically independent of each other, they allow duplex communications for increased communication efficiency. Therefore, each of the communication lines 102 preferably comprises an RS-232C cable. It is not necessary for each of the cryopumps 10 to be associated with and controlled by a vacuum pump controller 2. For space-saving considerations, it is also preferable to use one vacuum pump controller 2 to control a plurality of cryopumps.

Figure 4:
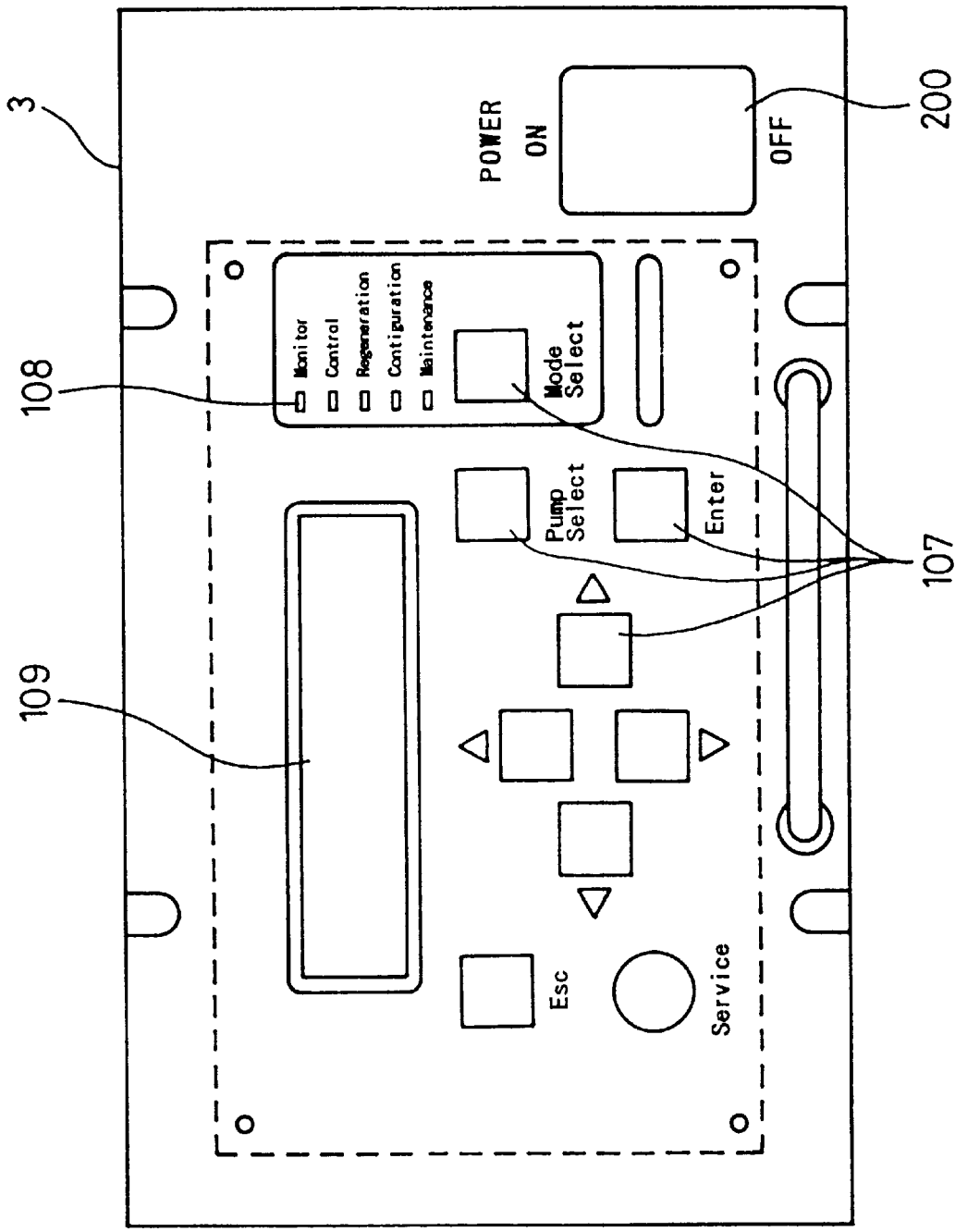
FIG. 4 is a front view of a front panel of the network control unit.

The functions of the network control unit 3 will be described below with respect to a front panel thereof. FIG. 4 shows in front elevation the front panel of the network control unit 3. The front panel has the liquid-crystal display panel 109, a power switch 200, the light-emitting diodes 108, and the switches 107. The switches 107 include a mode select switch, a pump select switch, an enter switch, and arrow switches. The mode select switch is used to select a monitor mode, a control mode, a regeneration mode, a configuration mode, and a maintenance mode. For selecting the monitor mode, the mode select switch is pressed, and one of the light-emitting diodes 108 which is labeled as "Monitor" is turned on. The monitor mode is selected as an initial setting. In the monitor mode, the liquid-crystal display panel 109 displays the values of temperature and pressure in a selected cryopump, whether the selected cryopump is operating or stopped or being regenerated. If a different cryopump is to be monitored, the pump select key 107 is pressed and the arrow keys 107 are pressed until the desired cryopump is selected. For selecting the control mode, the mode select switch is pressed again, and one of the light-emitting diodes 108 which is labeled as "Control" is turned on. In the control mode, a selected cryopump can manually be turned on and off by the enter switch 107.

In the regeneration mode, a selected cryopump can manually be turned on and off by the enter switch 107. In the configuration mode, control parameters and regeneration parameters for a selected cryopump can be set. Numerical values of those control parameters and regeneration parameters can be varied by the arrow switches 107, and entered by the enter switch 107. In the maintenance mode, a purge valve and a roughing valve which are attached to a selected cryopump can be manually opened and closed, and an operation time of the cryopump and a time from the regeneration mode can be set and displayed.

In the embodiment shown in FIG. 1, as described above, the vacuum pump controllers 2 are connected in parallel to the network control unit 3 by as many communication lines as the number of the vacuum pump controllers 2, to allow the network control unit 3 to simultaneously control the vacuum pump controllers 2. Therefore, command signals from the network control unit 3 can immediately reach the vacuum pump controllers 2 at the same time for quickly controlling the vacuum pumps.

Even if a line disconnection occurs or noise is introduced between the network control unit 3 and one of the vacuum pump controllers 2, or one of the vacuum pump controllers 2 fails or malfunctions, the other vacuum pump controllers 2 are not adversely affected by the line disconnection, the noise, or the vacuum pump controller failure or malfunction, and can properly monitor and control the corresponding cryopumps 10.

In the above embodiment, only RS-232C cables are used as the communication lines. Therefore, if the host computer 4 and the vacuum pump controllers 2 are apart from each other by a distance of 30 m or more, then no communications may possibly be carried out between the host computer 4 and the vacuum pump controllers 2 through the communication lines. Furthermore, if the network control unit 3 and the vacuum pump controllers 2 are apart from each other by a large distance, a plurality of communication lines extend therebetween over the large distance and occupy a large space and present an unsightly appearance.

Figure 5:
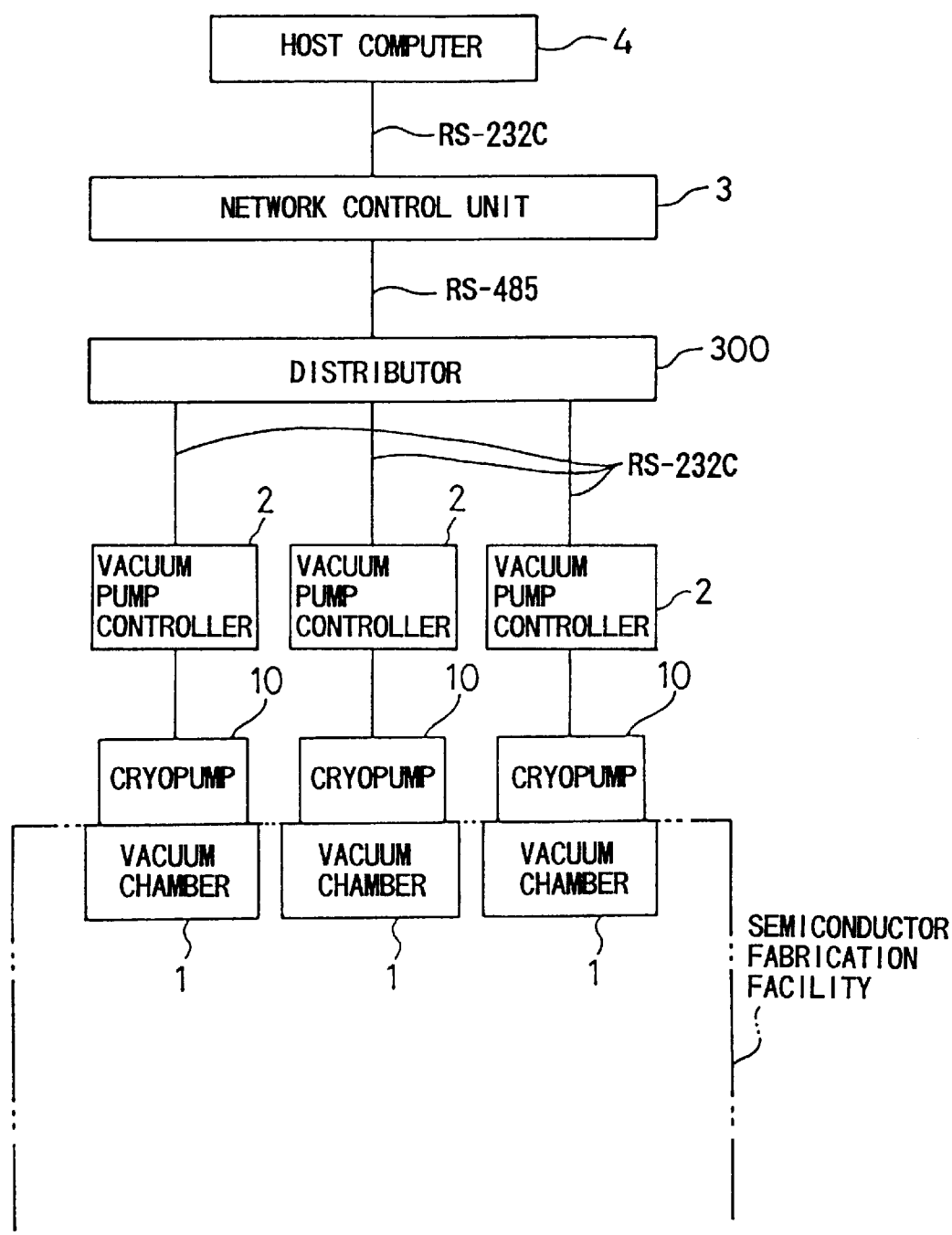
FIG. 5 is a block diagram showing a vacuum pump control system according to a second embodiment of the first aspect of the present invention.

A vacuum pump control system according to a second embodiment of the first aspect of the present invention will be described below with reference to FIG. 5. The system shown in FIG. 5 is designed to eliminate the above drawback. As shown in FIG. 5, the external communication devices 104, which are contained in one board of the network control unit 3 according to the above embodiment shown in FIG. 2, are placed on another board, i.e., housed in a distributor 300. The network control unit 3 and the distributor 300 are interconnected by an RS-485 cable, for example. The distributor 300 are connected to the vacuum pump controllers 2 by RS-232C cables. The RS-485 cable allows communications to be effected between the host computer 4 and the vacuum pump controllers 2 even when they are apart from each other by a distance of 30 m or more. With the distributor 300 and the vacuum pump controllers 2 being spaced from each other by a small distance, the RS-232C cables extending therebetween do not occupy a large space and do not present an unsightly appearance. The vacuum pump control system shown in FIG. 5 also offers the same advantages as the vacuum pump control system shown in FIG. 1.

Each of the cryopumps 10 and peripheral devices connected thereto will be described below with reference to FIG. 6.

Figure 6:
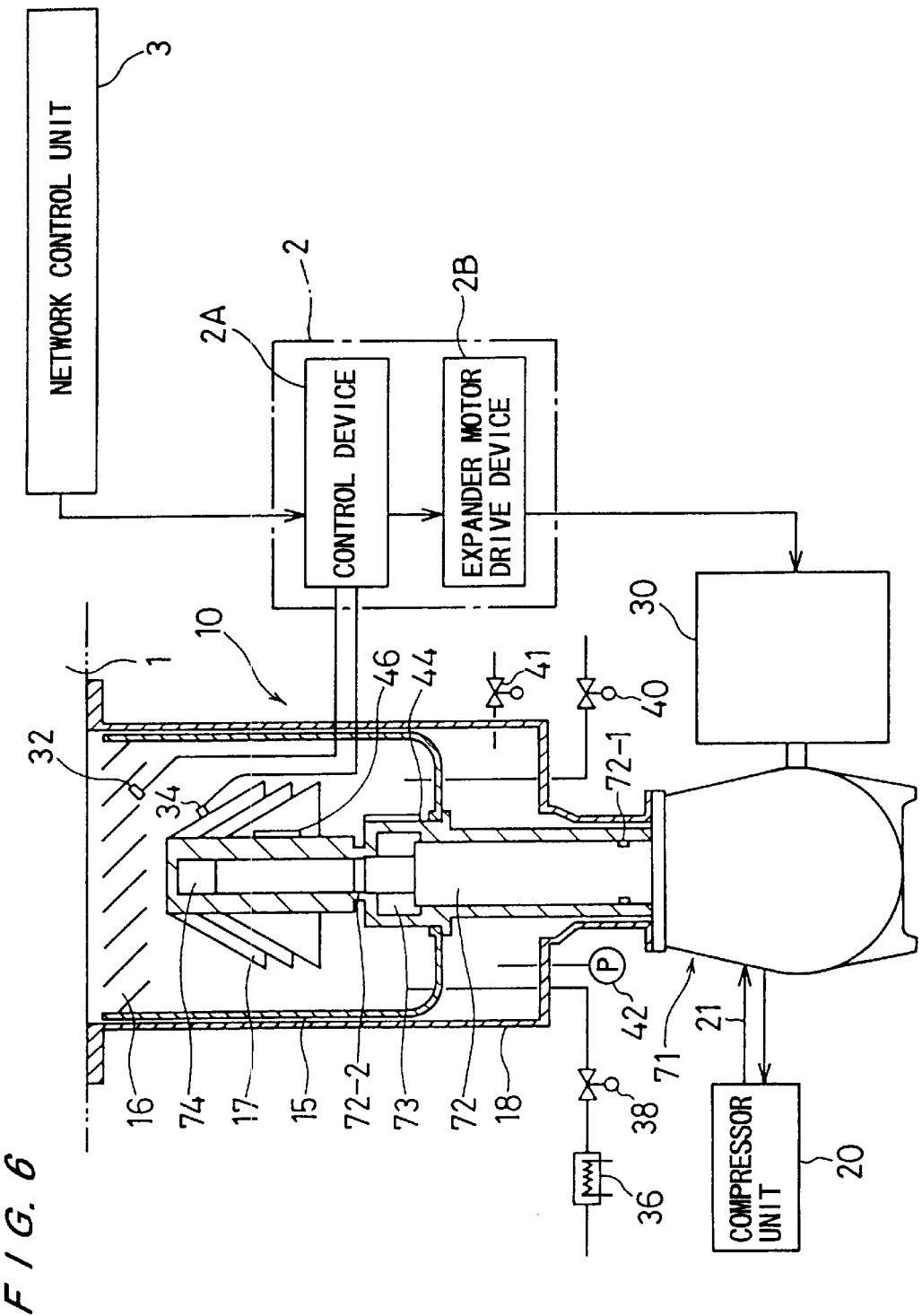
FIG. 6 is a cross-sectional view, partly in block diagram, of a cryopump and peripheral devices connected thereto which are controlled by the vacuum pump control system according to the present invention.

As shown in FIG. 6, the cryopump 10 has a refrigerator 71 to which a compressor unit 20 is connected through pipes 21. The refrigerator 71 has an expander 72 which is vertically movable by an expander motor 30. When the expander 72 moves vertically, a working gas (helium (He) gas) supplied under a high pressure at a normal temperature from the compressor unit 20 is adiabatically expanded in a first-stage expanding portion 73 and a second-stage expanding portion 74 which are cooled to a cryogenic temperature. The expander 72 has first- and second-stage seals 72-1, 72-2.

A first-stage cryopanel 16 is mounted on an upper end of the first-stage expanding portion 73 by a thermally conductive element 15. A second-stage cryopanel 17 is mounted directly on the second-stage expanding portion 74.

The first-stage expanding portion 73 and the second-stage expanding portion 74 of the refrigerator 71 are surrounded by a casing 18. The vacuum chamber 1 shown in FIG. 1 is connected to an upper end of the casing 18.

The cryopump 10 operates as follows: A high-pressure working gas from the compressor unit 20 is supplied to the refrigerator 71 through a valve (not shown) which is opened and closed in response to vertical movement of the expander 72, and adiabatically expanded in the first-stage expanding portion 73 and the second-stage expanding portion 74 which are cooled to a cryogenic temperature. The expanded working gas is delivered through a fluid passage (not shown) to the expander motor 30. After cooling the expander motor 30, the working gas is sent to the compressor unit 20. The working gas is compressed by the compressor unit 20 and processed to separate oil therefrom. The working gas is supplied again under a high pressure to the refrigerator 71. The first-stage expanding portion 73 and the second-stage expanding portion 74 which are cooled to the cryogenic temperature cool the first-stage cryopanel 16 and the second-stage cryopanel 17, respectively.

When the first-stage cryopanel 16 and the second-stage cryopanel 17 are cooled, the first-stage cryopanel 16 condenses on its surface mainly moisture in the vacuum chamber 1, and the second-stage cryopanel 17 condenses on its surface mainly an argon gas (Ar) and a nitrogen gas ($N_2$). Further, a hydrogen gas ($H_2$) is absorbed at the low temperature by an activated charcoal layer on the reverse side of the second-stage cryopanel 17. In this manner, the gases in the vacuum chamber 1 are evacuated.

One characteristic function, referred to as a gas evacuating function, of the vacuum pump controller 2 will be described below.

A temperature sensor 32 for detecting the surface temperature of the first-stage cryopanel 16 is attached to the first-stage cryopanel 16. A detected output signal from the temperature sensor 32 is supplied to a control device 2A of the vacuum pump controller 2. To keep the surface temperature of the first-stage cryopanel 16 at a predetermined level, the control device 2A outputs a command signal for controlling the rotational speed of the expander motor 30 to an expander motor drive device 2B. In response to the command signal, the expander motor drive device 2B controls the rotational speed of the expander motor 30. The vacuum pump controller 2 thus keeps the surface temperature of the first-stage cryopanel 16 at the predetermined level for thereby stably evacuating the gases from the vacuum chamber 1.

The vacuum pump controller 2 also has a regeneration control function. In the regeneration mode, after confirming that a valve (not shown) between the vacuum chamber 1 and the cryopump 10 is closed, the vacuum pump controller 2 stops the cryopump 10, turns on a purge heater 36, opens a purge valve 38 connected to the cryopump 10, thereby increasing the temperature and pressure in the cryopump 10. The vacuum pump controller 2 also turns on heaters 44, 46 attached respectively to the first-stage expanding portion 73 and the second-stage expanding portion 74 to heat the interior of the cryopump 10. When the pressure in the cryopump 10 reaches an atmospheric pressure, a relief valve 41 connected to the cryopump 10 is automatically opened to discharge the gases from the cryopump 10.

When the temperatures of the first-stage cryopanel 16 and the second-stage cryopanel 17 as detected by the temperature sensors 32, 34, respectively, exceed a predetermined temperature, the vacuum pump controller 2 turns off the heaters 44, 46.

At the end of the regeneration mode, as indicated by a control sequence in the vacuum pump controller 2, the vacuum pump controller 2 closes the purge valve 38 and opens a roughing valve 40 connected to the cryopump 10, and actuates a roughing pump (not shown) connected downstream of the vacuum pump controller 2 to lower the pressure in the cryopump 10. When the interior of the cryopump 10 reaches a predetermined degree of vacuum, the vacuum pump controller 2 closes the roughing valve 40 in order to check whether the cryopump 10 has completely been regenerated or not. If the cryopump 10 has insufficiently been regenerated, then since the pressure in the cryopump 10 increases to a level higher than a predetermined level, the cryopump 10 is roughly evacuated or regenerated again. The pressure in the cryopump 10 is measured by a vacuum gage 42.

If the cryopump 10 has completely been regenerated, then the expander motor drive device 2B of the vacuum pump controller 2 actuates the cryopump 10. Since the temperature in the cryopump 10 is close to a normal temperature, the expander motor 30 can be rotated at a maximum speed to cool down the cryopump 10 speedily.

The vacuum pump controller 2 transmits data on the operation statuses of the cryopumps 10 and the values of temperature, pressure, etc. in the cryopumps 10 to the network control unit 3, and receives command signals from the host computer 4 or the network control unit 3.

Figure 7:
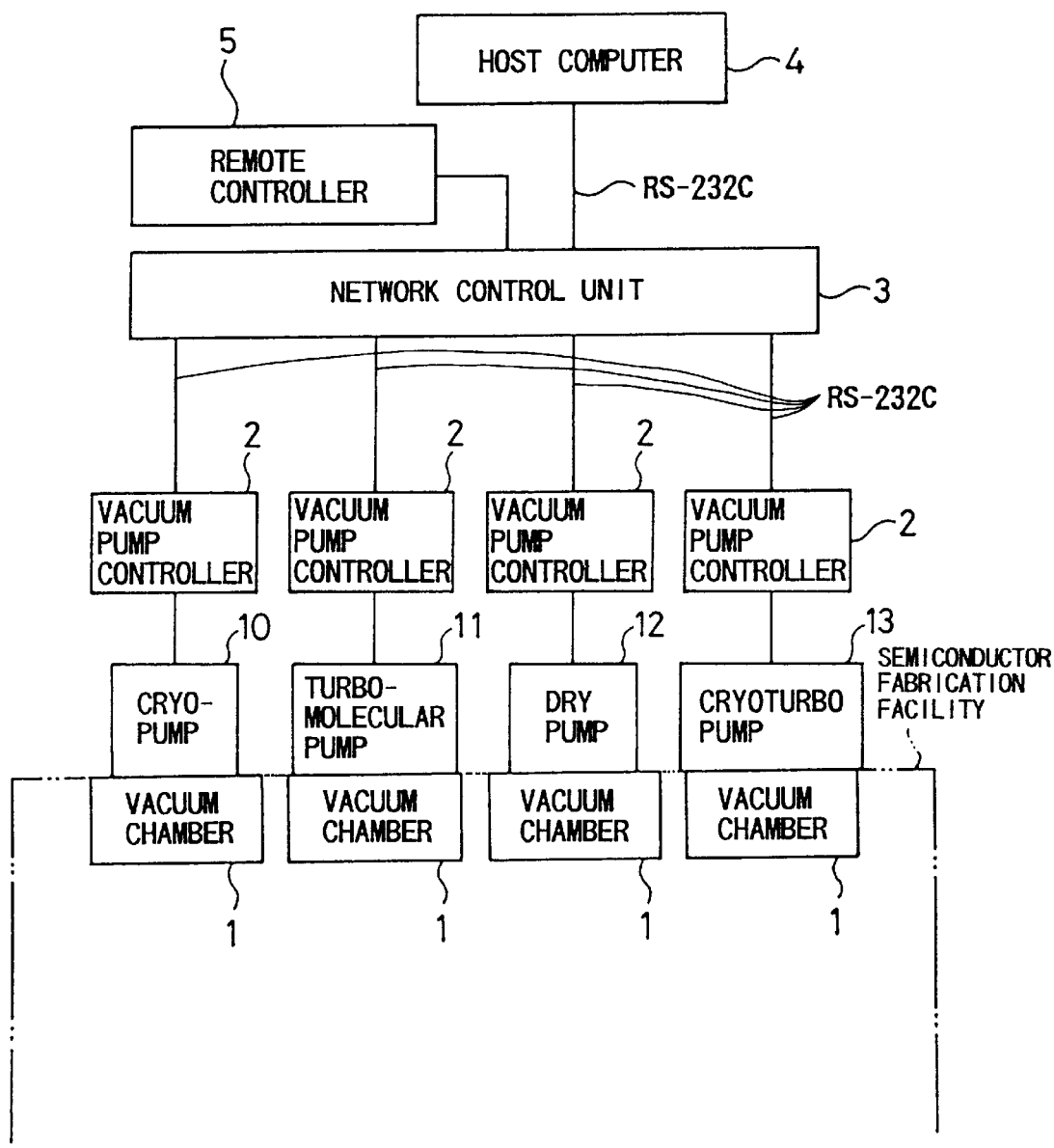
FIG. 7 is a block diagram showing a vacuum pump control system according to a third embodiment of the first aspect of the present invention.

FIG. 7 shows a vacuum pump control system according to a third embodiment of the first aspect of the present invention. As shown in FIG. 7, a semiconductor fabrication facility has a plurality of vacuum chambers 1 to which a plurality of vacuum pumps comprising at least one type of cryopump 10, turbomolecular pump 11, dry pump 12 comprising a Roots type vacuum pump, and cryoturbo pump 13 are connected, respectively. In the embodiment shown in FIG. 1, a plurality of vacuum pumps comprise only one type of vacuum pump, i.e., cryopumps, however, in the embodiment shown in FIG. 7, a plurality of vacuum pumps comprise various types of vacuum pumps including a cryopump, a turbomolecular pump, a dry pump comprising a Roots type vacuum pump, and a cryoturbo pump. Each of the vacuum pumps is connected to the vacuum pump controller 2. The vacuum pumps in FIG. 7 are controlled in the same manner as the vacuum pumps in FIG. 1. Since the network control unit 3 can control all the vacuum pump controllers 2 simultaneously, command signals delivered from the host computer 4 or the network control unit 3 reach all the vacuum pump controllers 2 immediately, and hence all the vacuum pump can be controlled rapidly. A dry pump comprising a Roots type vacuum pump (not shown) is provided at the downstream of each of the cryopump, the turbomolecular pump and the cryoturbo pump for assisting evacuation of those pumps.

A vacuum pump control system according to an embodiment of a second aspect of the present invention will be described below with reference to FIGS. 8 through 14.

Figure 8:
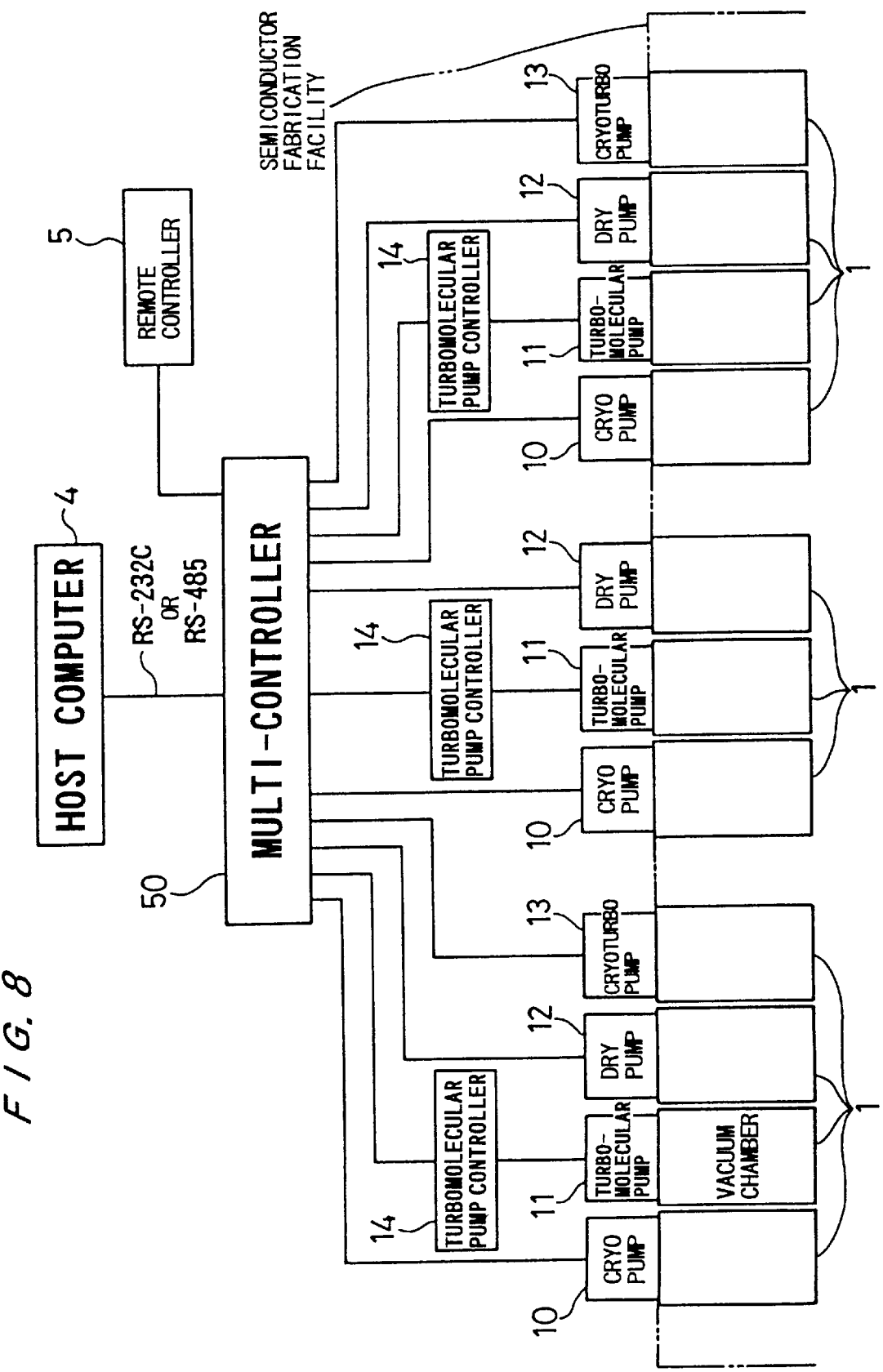
FIG. 8 is a block diagram showing a vacuum pump control system according to an embodiment of a second aspect of the present invention.

FIG. 8 is a block diagram showing a basic structure of the second aspect of the present invention. As shown in FIG. 8, a semiconductor fabrication facility has a plurality of vacuum chambers 1 to which a plurality of vacuum pumps comprising at least one type of cryopump 10, turbomolecular pump 11, dry pump 12 comprising a Roots type vacuum pump, and cryoturbo pump 13 are connected, respectively. The vacuum pumps 10, 11, 12 and 13 are connected to a multi-controller 50 which monitors and controls operation of the vacuum pumps, e.g., starting or stopping of the vacuum pumps. A dry pump comprising a Roots type vacuum pump (not shown) is provided at the downstream of each of the cryopump, the turbomolecular pump and the cryoturbo pump for assisting evacuation of those pumps.

The multi-controller 50 is connected to a host computer 4 of the semiconductor fabrication facility through an RS-232C or RS-485 cable for receiving command signals from the host computer 4 to start and stop the vacuum pumps 10, 11, 12 and 13, monitor operation statuses of the vacuum pumps 10, 11, 12 and 13, and set various settings for the vacuum pumps 10, 11, 12 and 13. The multi-controller 50 also has a relay function to transmit command signals from the host computer 4 to the turbomolecular pump controllers 14 and also a control function to control the turbomolecular pump controllers 14. Therefore, the multi-controller 50 has relay and control functions to relay command signals to and control external controllers connected thereto, such as the turbomolecular pump controllers 14.

The multi-controller 50 has on its front panel a display device such as LEDs or LCDs and an input device comprising switches. The multi-controller 50 has a manual control function to allow the operator to monitor and control the vacuum pumps 10, 11, 12 and 13 through the display device and the input device.

A remote controller 5 can be connected to the multi-controller 50 for remotely controlling the vacuum pumps 10, 11, 12 and 13. The remote controller 5 allows the operator to control the vacuum pumps 10, 11, 12 and 13 in the same manner as with the multi-controller 50.

Details of the multi-controller 50 will be described below with reference to FIG. 9.

Figure 9:
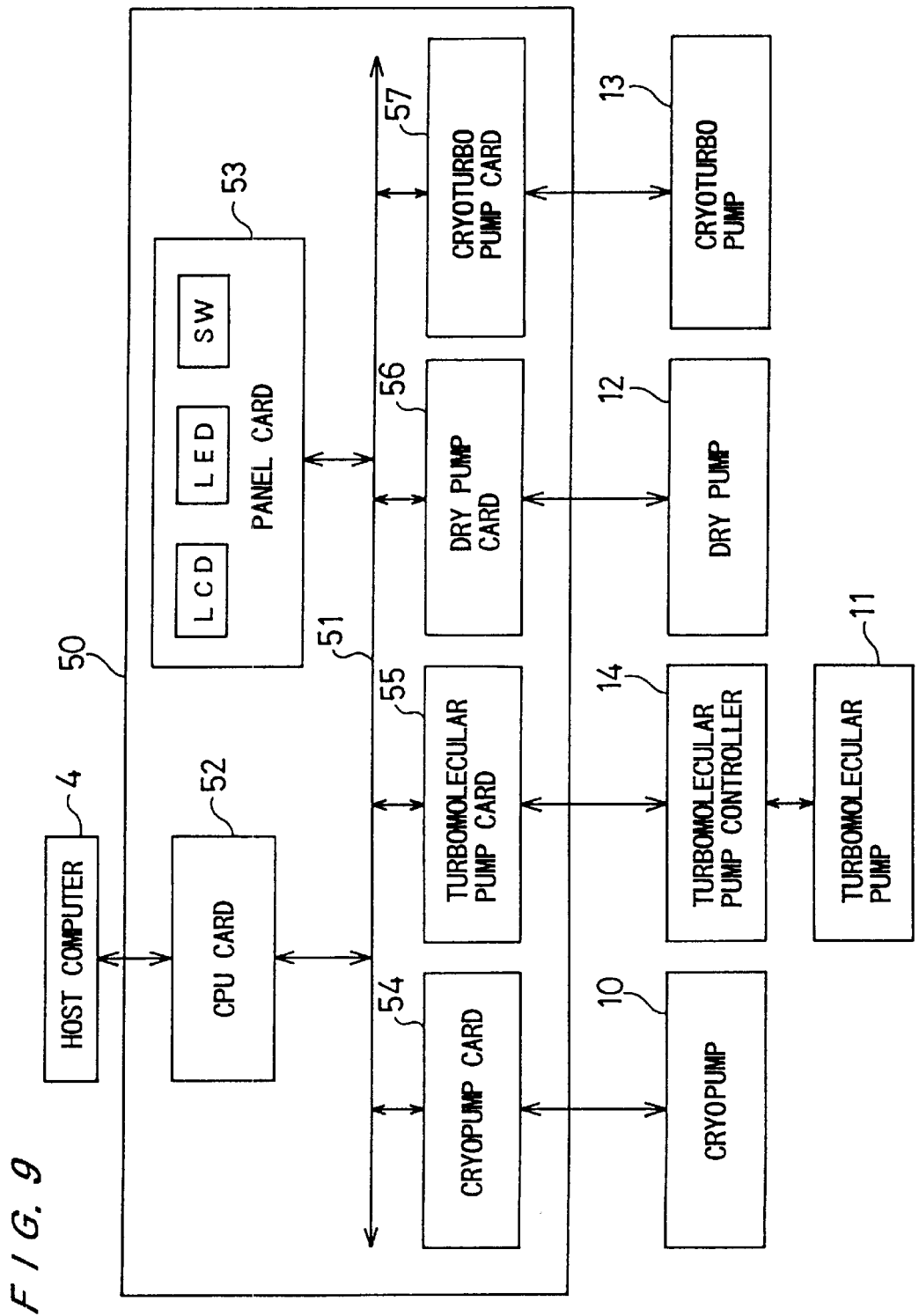
FIG. 9 is a block diagram showing a multi-controller and peripheral devices connected thereto in the vacuum pump control system shown in FIG. 8.

FIG. 9 is a block diagram showing the multi-controller 50 and peripheral devices connected thereto. The multi-controller 50 comprises a bus 51, a CPU card 52, a panel card 53, a cryopump card 54, a turbomolecular pump card 55, a dry pump card 56 and a cryoturbo pump card 57. The cards 52–57 are connected as control modules to the bus 51. The CPU card 52 comprises a microprocessor, a memory, a communication circuit, and has a communication function to communicate with the host computer 4 and the remote controller 5 and a control function to control the other cards 53–57 which are connected to the CPU card 52 through the bus 51. The panel card 53 has LCDs, LEDs and switches for inputting various signals and displaying various data.

Figure 10:
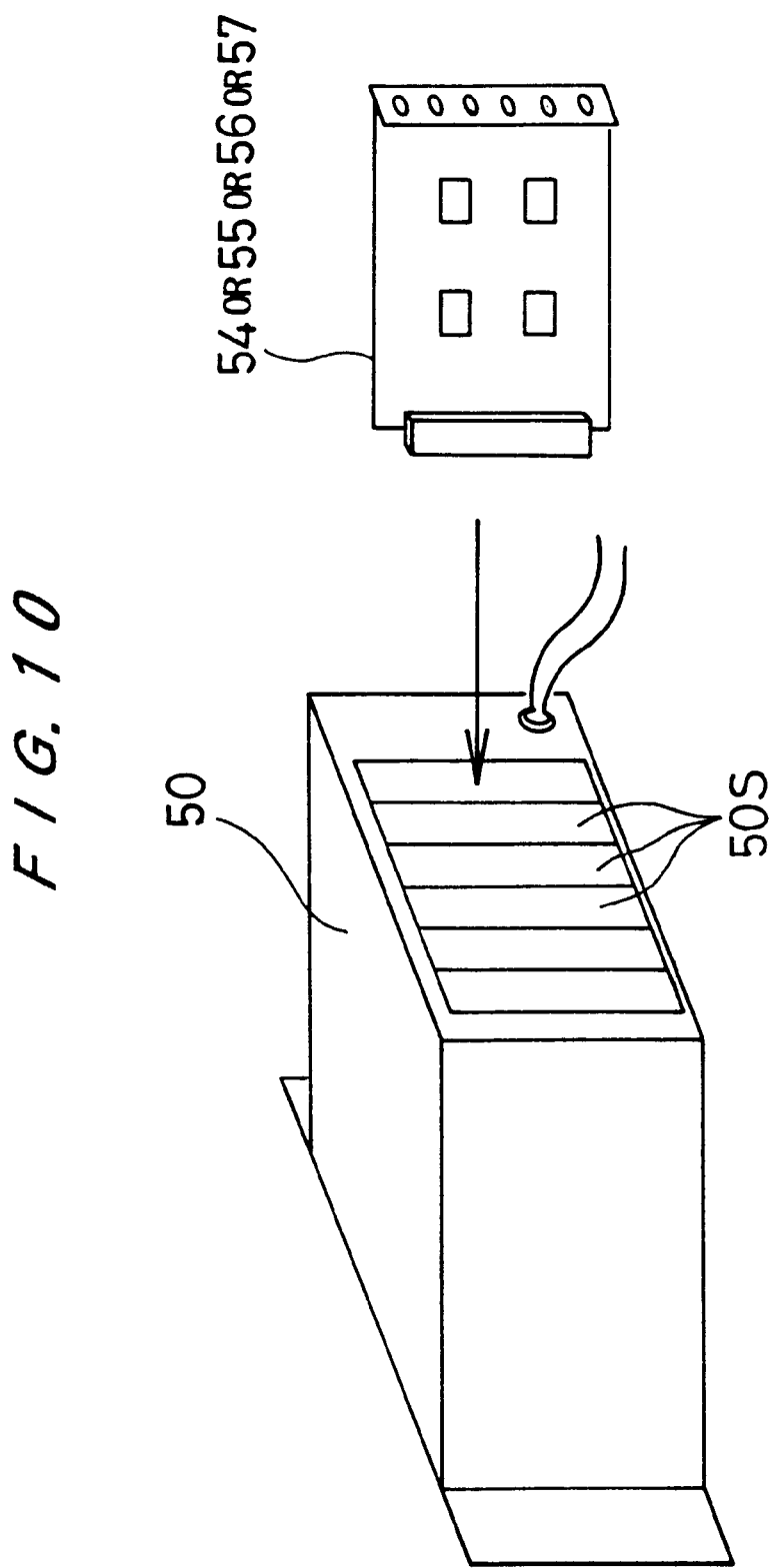
FIG. 10 is a perspective view of the multi-controller shown in FIG. 8 and various cards used therewith.

Each of the cryopump card 54, the turbomolecular pump card 55, the dry pump card 56 and the cryoturbo pump card 57 has an input/output function to input and output signals, and, if necessary, a power supply function to supply electric power, and a monitor/control function to monitor and control the corresponding vacuum pumps 10, 11, 12 and 13. As shown in FIG. 10, these cards 54, 55, 56 and 57 are detachably mounted in the multi-controller 50. Depending on the types and number of vacuum pumps which are used by the semiconductor fabrication facility, these cards are installed or removed so that the desired vacuum pumps can be monitored and controlled by a minimum number of cards. As shown in FIG. 10, the multi-controller 50 has a plurality of slots 50S defined in its rear panel for receiving the respective cards 54, 55, 56 and 57.

The multi-controller 50 with the detachable cards offers the following advantages:

(1) The semiconductor fabrication facilities of different customers use different numbers of vacuum pumps. However, the multi-controller 50 can monitor and control a different number of vacuum pumps simply by adding or removing cards 54, 55, 56 and 57 to handle the vacuum pumps which are actually involved.

(2) In the embodiments shown in FIGS. 1 and 7, each of the vacuum pumps needs to be associated with a vacuum pump controller. In the embodiment shown in FIGS. 8 through 10, however, only a single multi-controller is required, thus reducing the cost of the control system of the vacuum pumps and the installation space taken up by the vacuum pump control system.

(3) If different types of vacuum pumps are used, they can be monitored and controlled by installing corresponding cards in the multi-controller 50.

(4) Even when specifications of the vacuum pumps used are modified, the modifications can be handled by modifying the cards installed in the multi-controller 50.

(5) A new type of vacuum pumps can be used because they can be handled by a corresponding card which may be newly developed.

Figure 11:
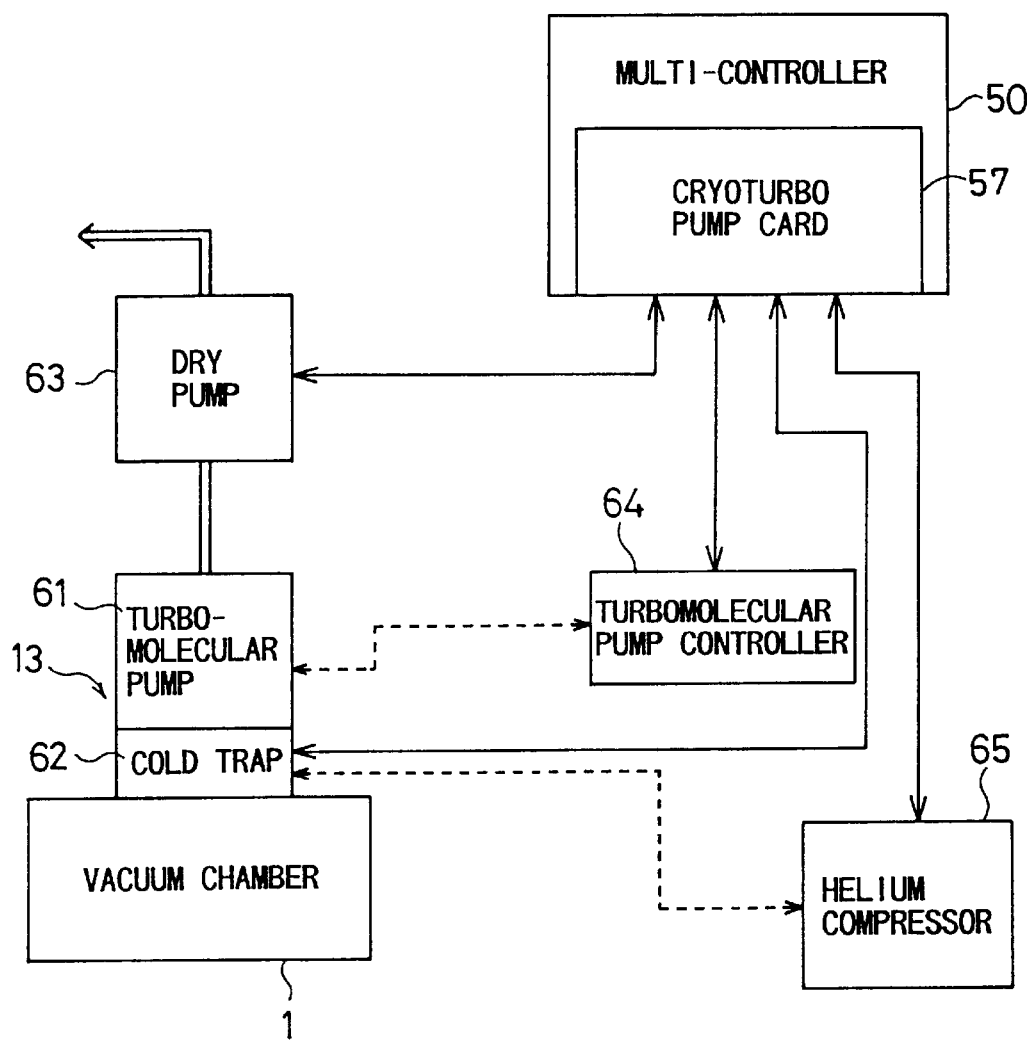
FIG. 11 is a block diagram showing a cryoturbo pump.

FIG. 11 is a block diagram showing a basic structure of the cryoturbo pump. The cryoturbo pump is referred to as a turbomolecular pump having a cold trap, and is a type of vacuum pump which has a cold trap provided at the upstream of the turbomolecular pump and having a panel which is kept at a cryogenic temperature and allows gases to be frozen and adsorbed thereon. As shown in FIG. 11, the cryoturbo pump 13 comprises a turbomolecular pump 61 and a cold trap 62. A dry pump 63 is connected to the turbomolecular pump 61 for assisting evacuation of the turbomolecular pump 61. The turbomolecular pump 61 is connected to a turbomolecular pump controller 64. The cold trap 62 is cooled to a cryogenic temperature by a helium compressor 65. The cryoturbo pump card 57 is connected to the dry pump 63, the turbomolecular pump controller 64, the cold trap 62 and the helium compressor 65 through communication lines.

The cryoturbo pump card 57 controls various devices as follows:

(1) The cryoturbo pump card 57 sends signals for starting or stopping the helium compressor 65. In response thereto, the helium compressor 65 is started and stopped.

(2) The cryoturbo pump card 57 controls power associated with the cold trap 62 such as power which is supplied to an expander for expanding helium gas compressed by the helium compressor 65, temperature of the cold trap 62, and a heater for regenerating the cold trap 62. A power supply for supplying power to the devices associated with the cold trap 62 is incorporated in the card 57, and is turned on and off by ON-OFF signals from the card 57. The temperature of the cold trap 62 is controlled by supplying temperature control signals from the card 57 to the devices associated with the cold trap 62. A heater is attached to the cold trap 62. A heater is attached to the cold trap 62 to regenerate the cold trap 62 and is controlled by signals from the card 57.

(3) A power supply for supplying power to the turbomolecular pump 61 is incorporated in the turbomolecular pump controller 64, and is turned on and off by ON-OFF signals from the card 57 to start and stop the turbomolecular pump 61. The turbomolecular pump controller 64 has a control circuit to send control signals to the turbomolecular pump 61 and control magnetic bearings in the turbomolecular pump 61.

(4) The dry pump 63 is operated and stopped by control signals from the card 57.

Figure 12:
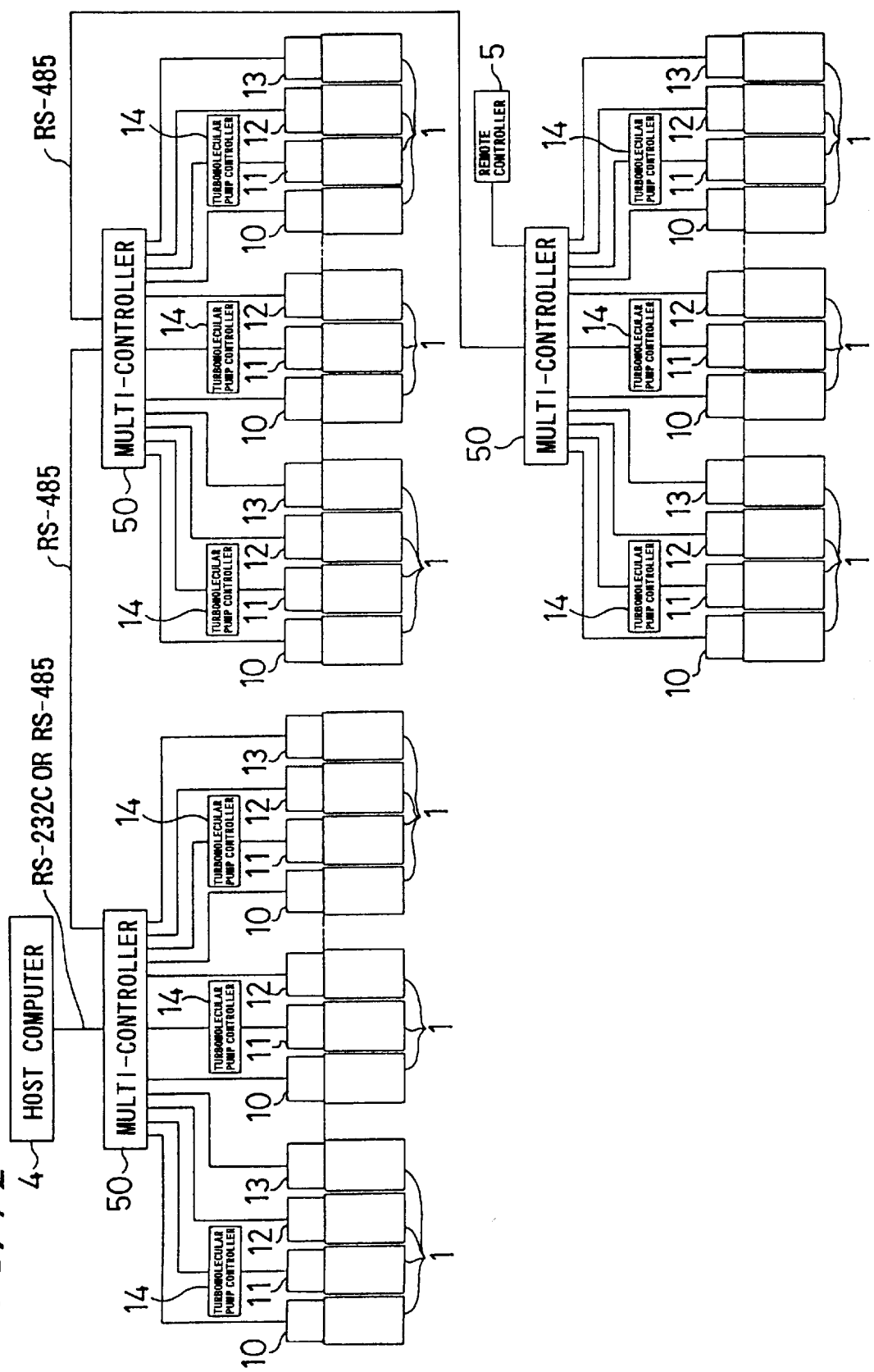
FIG. 12 is a block diagram of another vacuum pump control system which employs a series-connected array of multi-controllers shown in FIGS. 8 through 10.

FIG. 12 is a block diagram showing a vacuum pump control system which employs a series-connected array of multi-controllers 50 shown in FIGS. 8 through 10. As shown in FIG. 12, in the case where the number of vacuum pumps to be monitored and controlled exceeds the number of vacuum pumps that can be monitored and controlled by a single multi-controller 50, a plurality of multi-controllers 50 are connected in series by RS-485 cables for monitoring and controlling those vacuum pumps.

Figure 13:
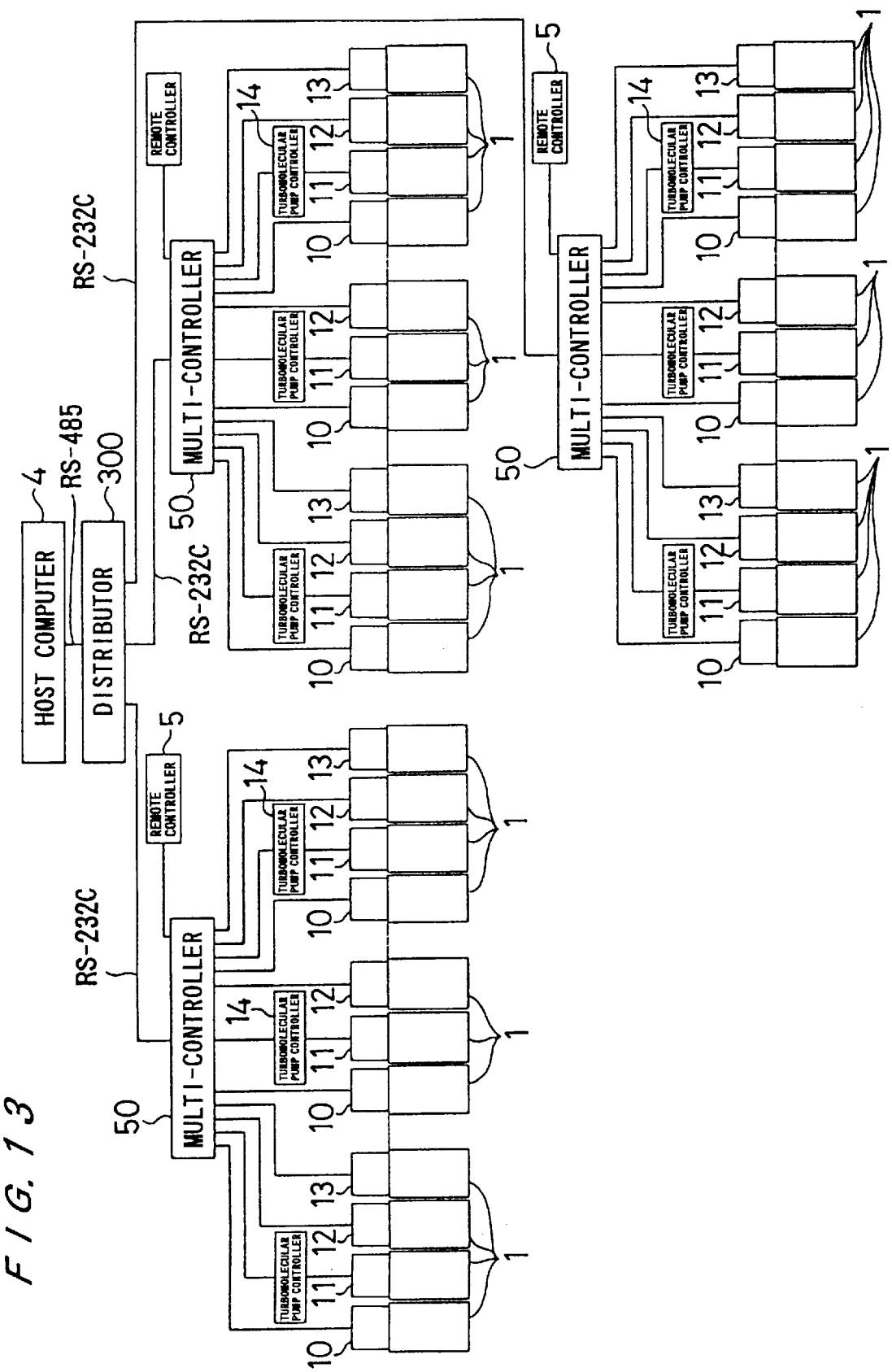
FIG. 13 is a block diagram of still another vacuum pump control system which employs a parallel-connected array of multi-controllers shown in FIGS. 8 through 10.

FIG. 13 is a block diagram showing another vacuum pump control system which employs a parallel-connected array of multi-controllers 50 shown in FIGS. 8 through 10. In FIG. 13, a plurality of multi-controllers 50 are in parallel connected by RS-232C cables for monitoring and controlling a number of vacuum pumps. The multi-controllers 50 are connected to a distributor 300 which is connected to a host computer 4 through an RS-485 cable, for example.

Figure 14:
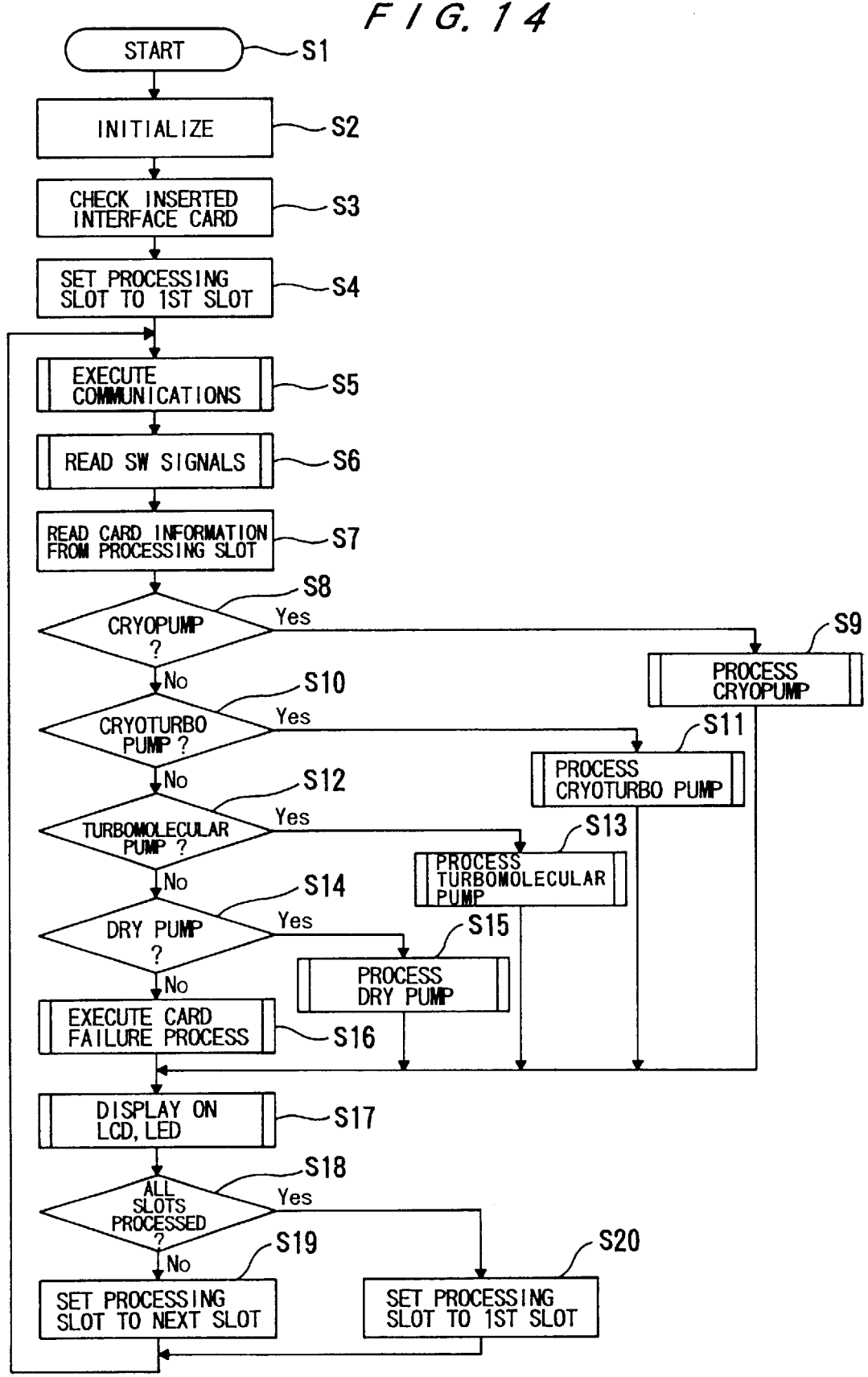
FIG. 14 is a flowchart of a processing sequence of the multi-controller.

FIG. 14 shows a processing sequence of the multi-controller 50.

As shown in FIG. 14, the processing sequence starts in a step S1 when the power supply of the multi-controller 50 is turned on. In a step S2, a memory of the multi-controller 50 is initialized and initial setting of peripheral devices connected thereto is performed. Then, whether interface cards, i.e., vacuum pump cards 54, 55, 56 and 57, are inserted in the slots 50S or not is checked in a step S3. If the interface cards are inserted in the slots 50S, then the types (cryopump, cryoturbo pump, turbomolecular pump, dry pump) of the interface cards are identified. In a step S4, a processing slot is set to a first one of the slots 50S. In a step S5, transmission and receiving signals to and from an external device connected to the multi-controller 50 are carried out. In a step S6, signals from switches on the front panel of the multi-controller 50 are read. In a step S7, card information from the interface card inserted in the processing slot is read. In a step S8, whether the read card information represents a cryopump or not is identified. If the card information represents a cryopump, then the cryopump is started, stopped, monitored, or regenerated in a step S9. If the card information does not represent a cryopump in the step S8, then whether the read card information represents a cryoturbo pump or not is identified in a step S10. If the card information represents a cryoturbo pump, then the cryoturbo pump is started, stopped, monitored, or regenerated in a step S11. In the step 11, peripheral devices associated with the cryoturbo pump are also monitored and controlled. If the card information does not represent a cryoturbo pump in the step S10, then whether the read card information represents a turbomolecular pump or not is identified in a step S12. If the card information represents a turbomolecular pump, then the turbomolecular pump is started, stopped, monitored, or regenerated in a step S13. If the card information does not represent a turbomolecular pump in the step S12, then whether the read card information represents a dry pump or not is identified in a step S14. If the card information represents a dry pump, then the dry pump is started, stopped, monitored, or regenerated in a step S15. If the card information does not represent a dry pump, then since a pump type is unable to be identified from the card information, a card failure process is executed in a step S16. In a step S17, data are displayed on the LCDs depending on a presently selected display menu, and the LEDs flicker depending on present operation statuses. In a step S18, whether the present processing slot is a final one of the slots 50S or not, i.e., whether all the slots 50S have been processed or not is identified. If all the slots 50S have not been processed yet, then the processing slot is shifted to a next one of the slots 50S in a step S19. If all the slots 50S have been processed, then the processing slot is returned to the first one of the slots 50S in a step S20.

In the embodiment shown in FIGS. 8 through 14, the vacuum pumps 10, 11, 12 and 13 can be monitored and controlled by the single multi-controller 50. Since the cards 54, 55, 56 and 57 are detachably inserted as control modules in the multi-controller 50, the vacuum pumps 10, 11, 12 and 13 which need to be monitored and controlled can be handled by a minimum amount of hardware provided by the cards 54, 55, 56 and 57. A plurality of different types of vacuum pumps and a plurality of vacuum pumps can thus be controlled by control modules which correspond to those different types of vacuum pumps.

Although certain preferred embodiments of the present invention have been shown and described in detail, it should be understood that various changes and modifications may be made therein without departing from the scope of the appended claims.

What is claimed is:

1. A vacuum pump control system for controlling a plurality of vacuum pumps, comprising:

a host computer;

a plurality of vacuum pump controllers connected respectively to said vacuum pumps; and a network control unit for transmitting information between said host computer and said vacuum pump controllers, said vacuum pump controllers being connected in parallel to said network control unit by respective communication lines.

2. A vacuum pump control system according to claim 1, wherein said plurality of vacuum pumps include at least one type of vacuum pump having a cryopump, a turbomolecular pump, a dry pump and a cryoturbo pump.

3. A vacuum pump control system according to claim 1, wherein said host computer and said network control unit are connected to each other by an RS-232C cable.

4. A vacuum pump control system according to claim 1, wherein each of said communication lines comprises an RS-232C cable.

5. A vacuum pump control system according to claim 1, further comprising a remote controller connected to said network control unit for remotely controlling said vacuum pumps.

6. A vacuum pump control system for controlling a plurality of vacuum pumps, comprising:
   a host computer; and
   a multi-controller connected between said host computer and said vacuum pumps for controlling said vacuum pumps,
   wherein said multi-controller has a plurality of detachable control modules for controlling said vacuum pumps.

7. A vacuum pump control system according to claim 6, wherein said plurality of vacuum pumps include at least one type of vacuum pump having a cryopump, a turbomolecular pump, a dry pump and a cryoturbo pump.

8. A vacuum pump control system according to claim 6, wherein said multi-controller monitors and controls a plurality of types of vacuum pumps through said control modules.

9. A vacuum pump control system according to claim 6, further comprising a remote controller connected to said multi-controller for remotely controlling said vacuum pumps.

10. A vacuum pump control system according to claim 6, wherein a plurality of said multi-controllers are provided and connected in series by at least one RS-485 cable for controlling a number of vacuum pumps.

11. A vacuum pump control system according to claim 6, wherein a plurality of said multi-controllers are provided and connected in parallel by RS-232C cables for controlling a number of vacuum pumps.

* * * * *